United States Patent [19]

White

[11] 4,208,164
[45] Jun. 17, 1980

[54] BAR CUT-OFF FEEDING MACHINE
[75] Inventor: Frank F. White, Lyndhurst, Ohio
[73] Assignee: Automation Development Corporation, Mentor, Ohio
[21] Appl. No.: 887,822
[22] Filed: Mar. 17, 1978
[51] Int. Cl.² .................... B65G 65/02; B66G 47/26; B21D 43/08; B23D 33/02
[52] U.S. Cl. .................................. 414/748; 414/745; 414/118; 198/458; 198/690
[58] Field of Search ................ 198/690, 458; 414/748, 414/745, 118; 214/1 P, 1 PB; 83/23, 262

[56] References Cited
U.S. PATENT DOCUMENTS

| 2,939,568 | 6/1960 | Israelson et al. | 198/690 |
| 3,036,413 | 5/1962 | Schulte | 414/748 X |
| 3,483,959 | 12/1969 | Reiley | 198/690 |
| 3,774,779 | 11/1973 | White | 414/748 |
| 4,098,393 | 7/1978 | Wykes et al. | 198/458 |

FOREIGN PATENT DOCUMENTS 958751  5/1964  United Kingdom ................ 414/748

Primary Examiner—Donald R. Schran
Attorney, Agent, or Firm—Bosworth, Sessions & McCoy

[57] ABSTRACT

A high-speed bar feeding system for automatically feeding long non-cylindrical (concrete) reinforcing bars wherein the bars are removed from a bundle, placed in a single row on an inclined feed ramp having a multiplicity of support rolls and overhead retaining means adjacent the upper surfaces of the bars, the bars are transferred several at a time from the ramp to a conveyor adjacent the ramp having driven cylindrical rolls and a series of spaced fanning magnets located between the conveyor rolls which position the bars with a predetermined spacing, and the bars are advanced to magnetic drive rolls having several V-grooves to receive the bars and guide them through a cut-off machine to a retractable length gauge. Unique escapement means are employed to lift the bars comprising a series of arms which swing from an inclined retracted position below the conveyor rolls to an inclined raised position wherein the several bars move laterally off the feed ramp by gravity to a position above the conveyor rolls. Each escapement arm has a multiplicity of support rolls to facilitate movement of the non-cylindrical bars and has an escapement plate to engage the first of the remaining bars on the ramp. A unique control system allows operation of the escapement arms a short time before the flat roll conveyor is clear to receive more bars so that the bars can be fed continuously to the cut-off machine with no time delay.

12 Claims, 17 Drawing Figures

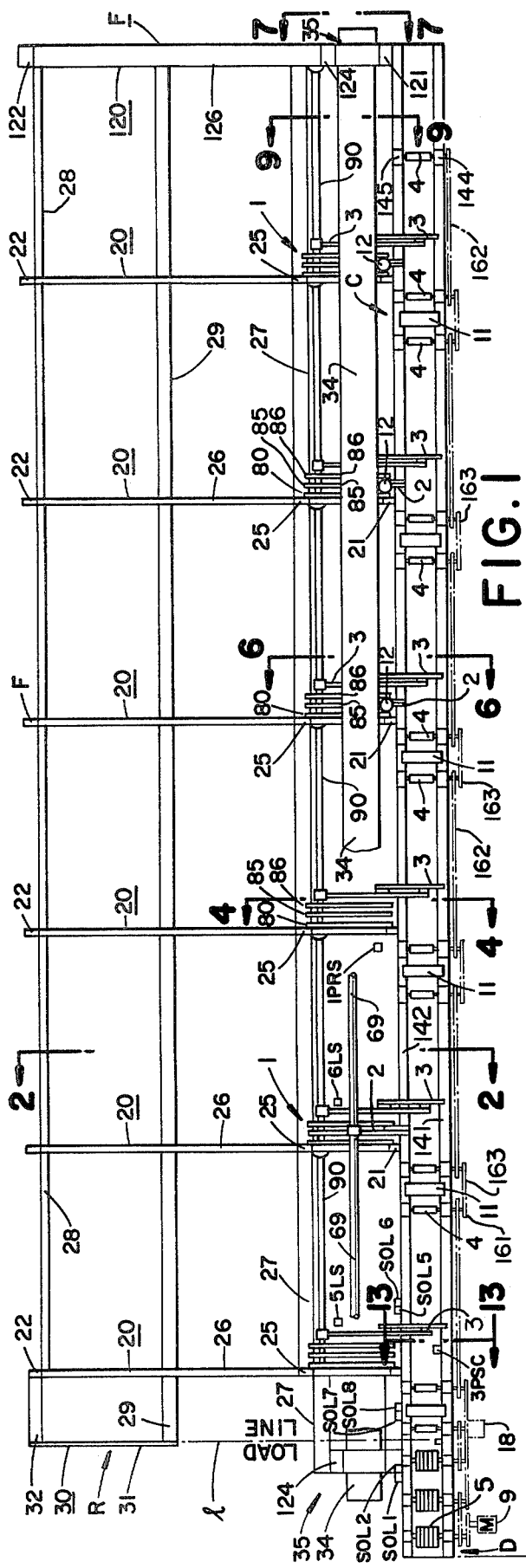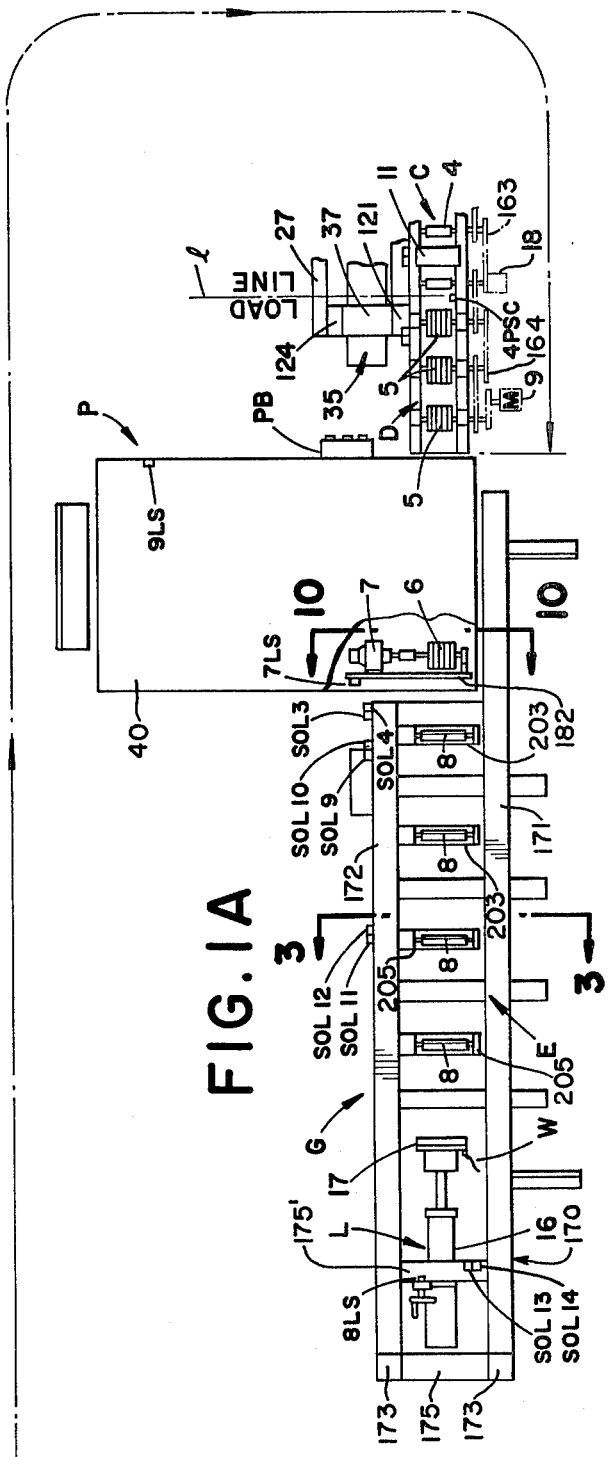

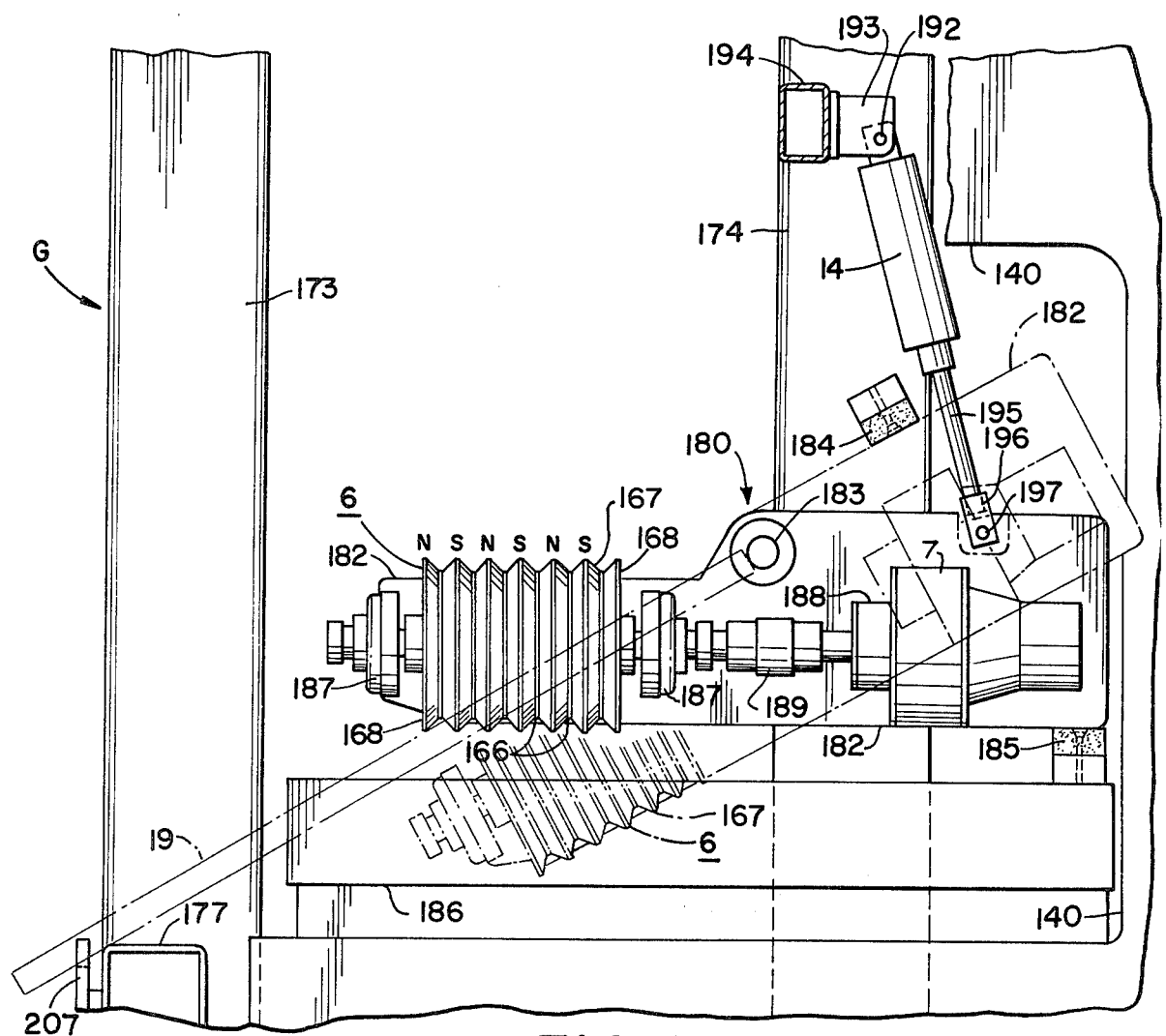
FIG. 10
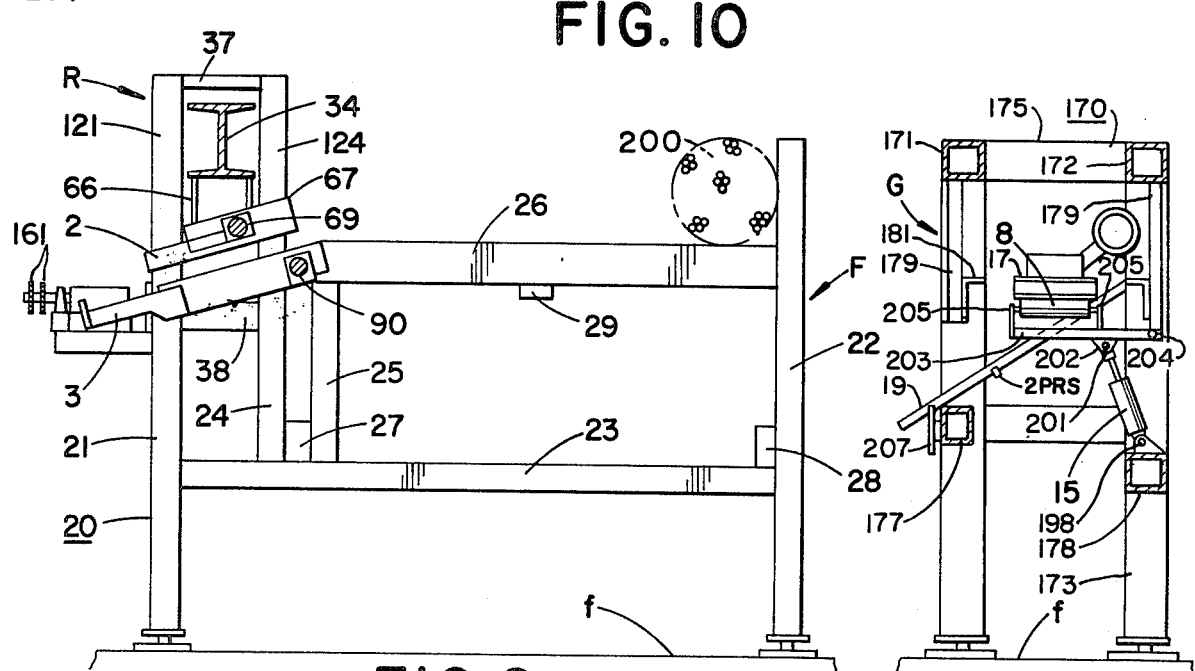
FIG.2
FIG.3

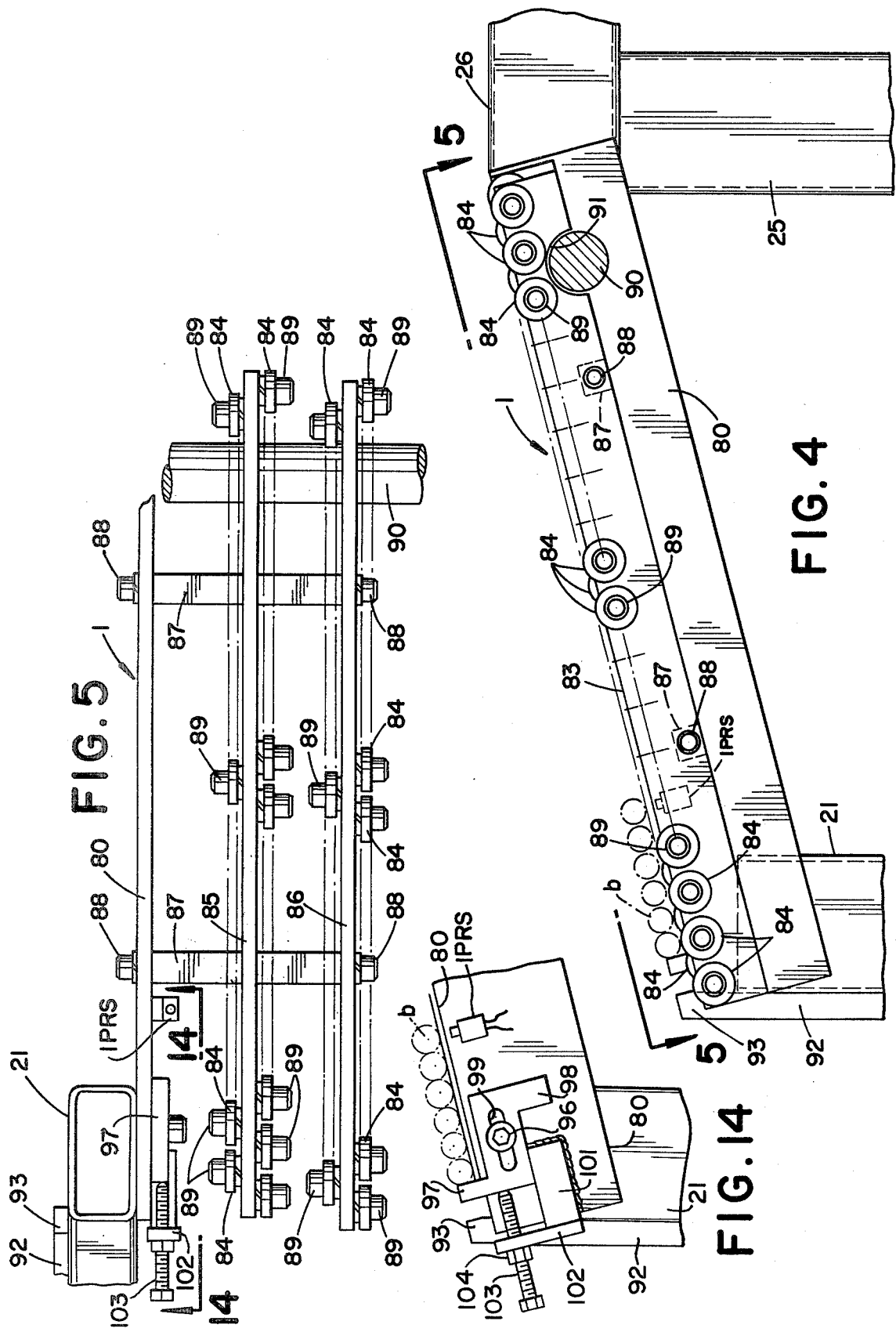

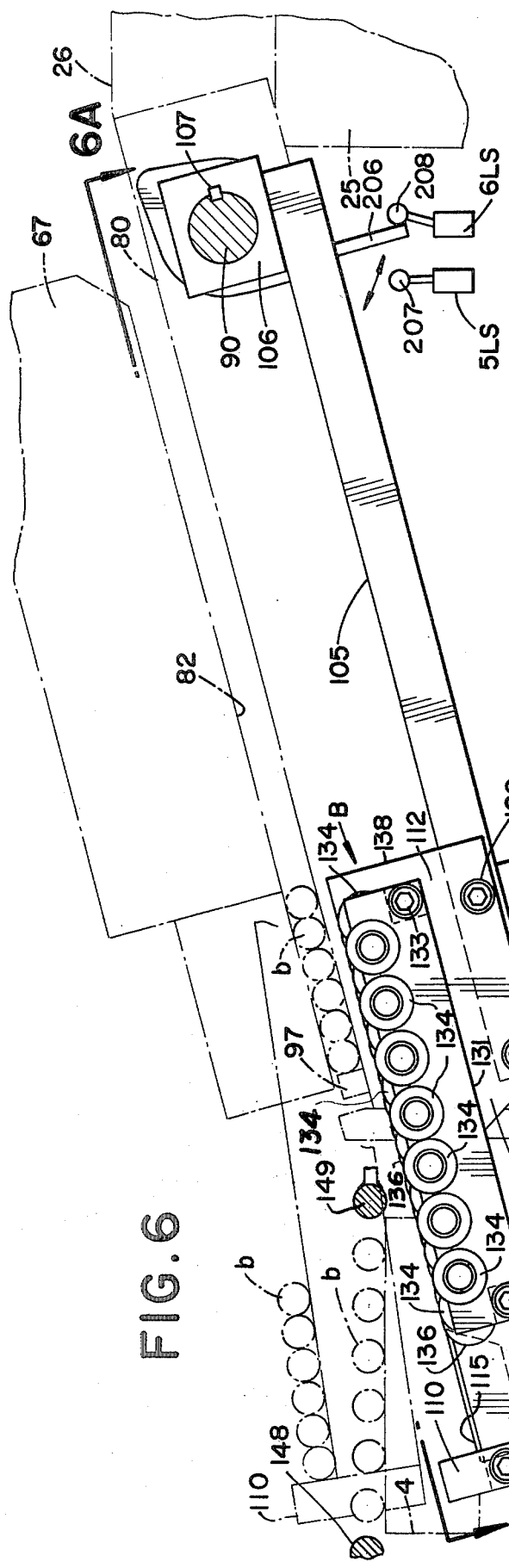
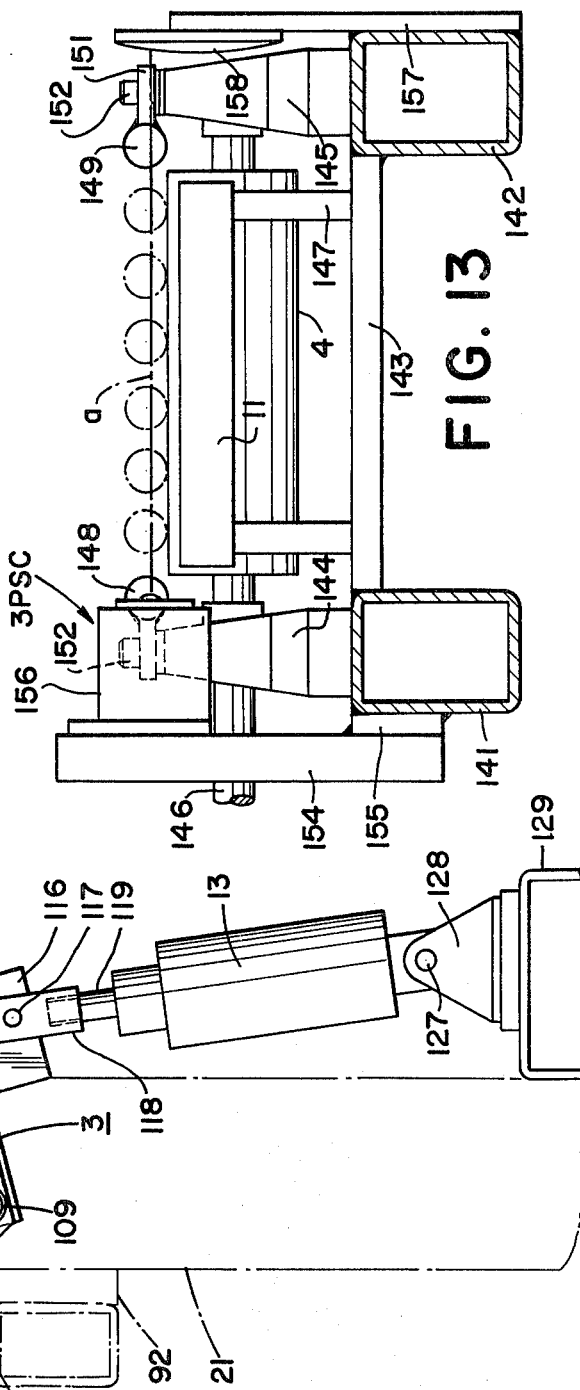

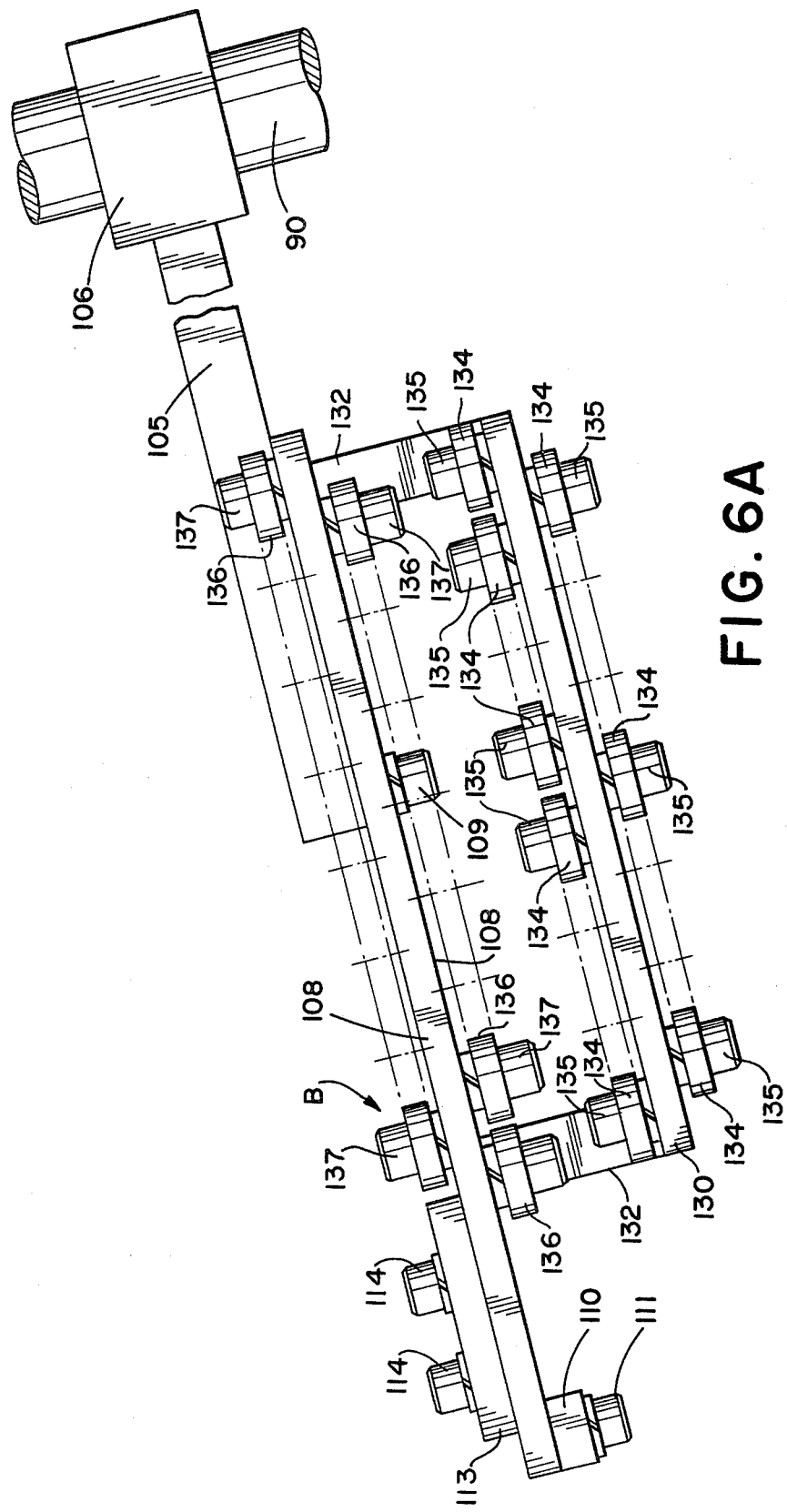

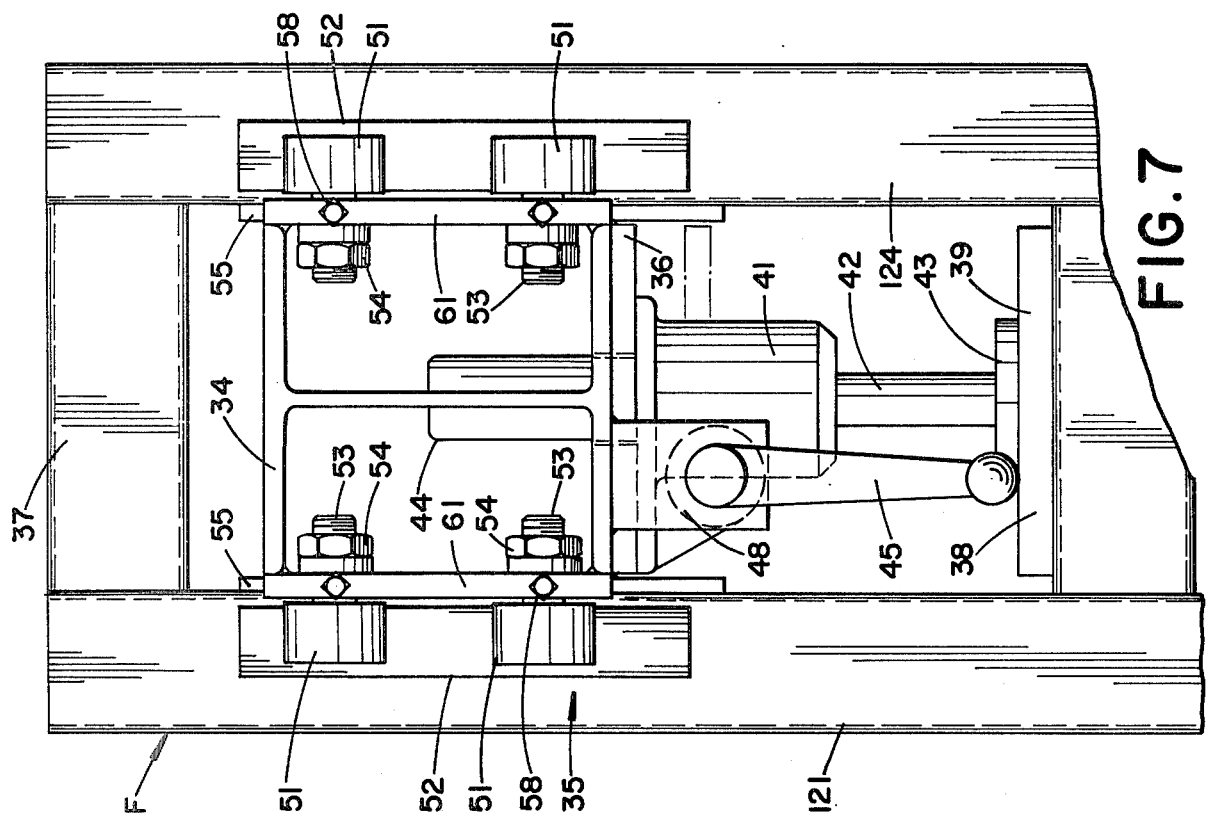
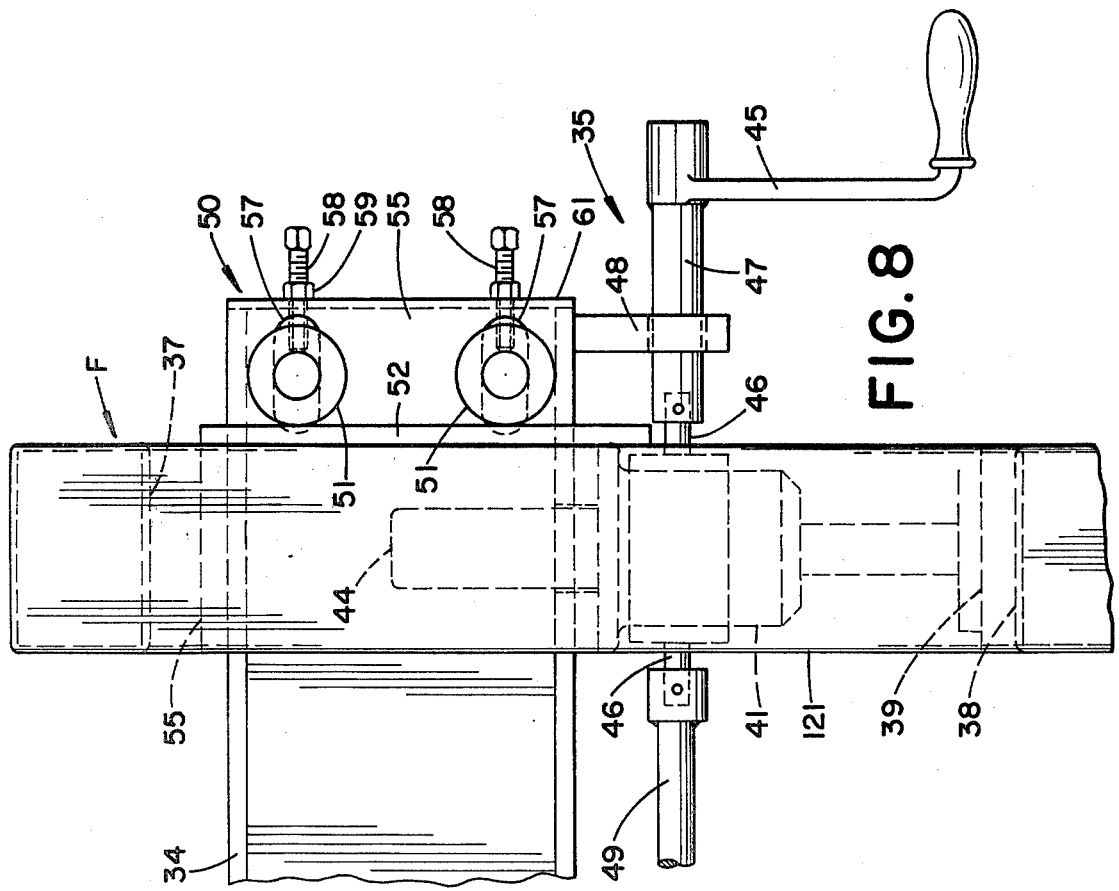

BAR CUT-OFF FEEDING MACHINE

BACKGROUND OF THE INVENTION

The present invention relates to a bar feeding system for automatic feeding and cutting of reinforcing bars and the like wherein long lengths of the bars are fed several at a time from an inclined storage ramp to a conveyor and are spaced apart and fed through a cut-off machine or press by magnetic means including magnetic V-grooved drive rolls.

Heretofore, it has been difficult to handle conventional concrete reinforcing bars, known as "rebars", because of the irregular deformed non-cylindrical outer surface which interferes with rolling of such bars. It has been the practice to cut long lengths of such "rebars" by loading the bars manually onto a conveyor and guiding them to a press or cut-off machine by means of V-grooved rolls. For example, rebars with long lengths, such as 50 feet or more, have been loaded manually and fed several at a time to a shear or cut-off machine where they are cut to shorter lengths.

Various types of bar feeders have heretofore been provided for handling long bars of relatively small diameter and for transferring such bars from a storage ramp to a conveyor, but these were not suitable for handling "rebars" and could not provide automatic feeding of such "rebars" several at a time to the conveyor. Instead it has been the practice to load the V-grooved rolls of the conveyor manually when feeding rebars to a cut-off machine.

SUMMARY OF THE INVENTION

The present invention overcomes the problems involved in feeding "rebars" and other non-cylindrical bars or tubes and provides a bar feeding system capable of reliable, efficient, automatic feeding of rebars several at a time from an inclined storage ramp to V-grooved rolls of a roller conveyor.

In accordance with the invention a large number of bars from a bundle are located in parallel side-by-side relation on an inclined feed ramp having a multiplicity of support rolls and having overhead retainer means near the upper surfaces of the bars to maintain them in a single row. Unique escapement means are provided for lifting a predetermined number of bars off the ramp and for transferring them laterally to the cylindrical rolls of a flat roll conveyor. Said escapement means includes a plurality of roller-ramp escapement arms which swing from an inclined retracted position below the cylindrical conveyor rolls to a less inclined raised position above the rolls wherein the arms form a ramp on which the bars are free to move transversely by gravity to a position above said rolls. A multiplicity of support rolls on each arm provide a roller ramp. Overhead retainer means are located above the bars and move upwardly with the escapement arms to maintain the bars in a single row as they move transversely down the roller ramp. Magnetic means are provided to induce polarity in the bars and cause them to separate when the escapement arms are lowered to transfer the bars to the conveyor rolls, whereby the bars have a predetermined even spacing on the cylindrical rolls. The magnetic means preferably comprises fanning magnets spaced at fixed locations along the length of the conveyor and stationary bars at opposite sides of the conveyor parallel to the direction offeed.

A plurality of magnetic drive rolls are provided downstream of the flat-roll conveyor with regularly spaced V-grooves to receive the rebars and guide them through the press or cut-off machine.

Conveyor means are provided for supporting the rebars at the discharge side of the press including support rolls which swing automatically from a normal horizontal position to an inclined discharge position as the ram of the press is lowered. The conveyor means includes a motor-driven magnetic support drive roll with V-grooves to receive the bars and a flat-roll outfeed conveyor with a series of spaced cylindrical idler support rolls.

A length gauge is provided at the end of the outfeed conveyor which has rails and support wheels to facilitate major adjustments and which has a retractable stop for engaging the ends of the bars received by the outfeed conveyor rolls. The stop is automatically retracted just before the bars are sheared or cut.

A unique automatic control system is provided for automatically controlling the escapement arms, the overhead retainer arms, the conveyor drives, and the pneumatic cylinders for the support rolls whereby the rebars are continually fed from the conveyor through the press or cut-off machine, and are continually fed from the inclined storage ramp to the conveyor. Time delays are avoided by a unique arrangement which initiates operation of the escapement arms before the infeed conveyor is clear to receive the bars and which lowers a number of bars onto the conveyor rolls as soon as the trailing ends of the bars on the conveyor move out of the way, whereby there is an uninterrupted supply of bars to the inlet of the press or cut-off machine.

The bar feeding system of this invention provides reliable automatic feeding of rebars and other non-cylindrical bars or tubes or long length and makes it possible to cut large numbers of bars economically in a minimum period of time with simple equipment.

BRIEF DESCRIPTION OF THE DRAWINGS

In the drawings:

FIG. 1 is a forshortened top plan view on a reduced scale showing a bar feeder constructed according to the present invention;

FIG. 1A is a continuation of FIG. 1 on the same scale showing an outfeed conveyor and press for effecting cutting or shearing of the bars and discharge of the cut bars;

FIG. 2 is a transverse sectional view taken on the line 2—2 of FIG. 1 and on a larger scale;

FIG. 3 is a transverse sectional view taken on the line 3—3 of FIG. 1A and on a larger scale;

FIG. 4 is a fragmentary transverse sectional view on a reduced scale taken substantially on the line 4—4 of FIG. 1;

FIG. 5 is a fragmentary top view taken on the line 5—5 of FIG. 4;

FIG. 6 is a fragmentary transverse sectional view taken on the line 6—6 of FIG. 1 and on a larger scale, the moved positions of the escapement arm being shown in broken lines;

FIG. 7 is a transverse view taken on the line 7—7 of FIG. 1 and on a larger scale;

FIG. 8 is a side elevational view of the apparatus of FIG. 7;

FIG. 10 is a fragmentary transverse elevational view taken on the line 10—10 of FIG. 1A and on a larger scale; the lower position of the support roll being shown in broken lines;

FIG. 6A is a fragmentary top view of the escapement arm of FIG. 6 with parts omitted;

FIG. 13 is a fragmentary transverse sectional view showing the fanning magnet and the photoelectric switch located on the enfeed conveyor;

FIG. 14 is a fragmentary transverse elevational view showing the adjustable stop for the inclined feed ramp.

DESCRIPTION OF THE PREFERRED EMBODIMENTS

Figure 9:
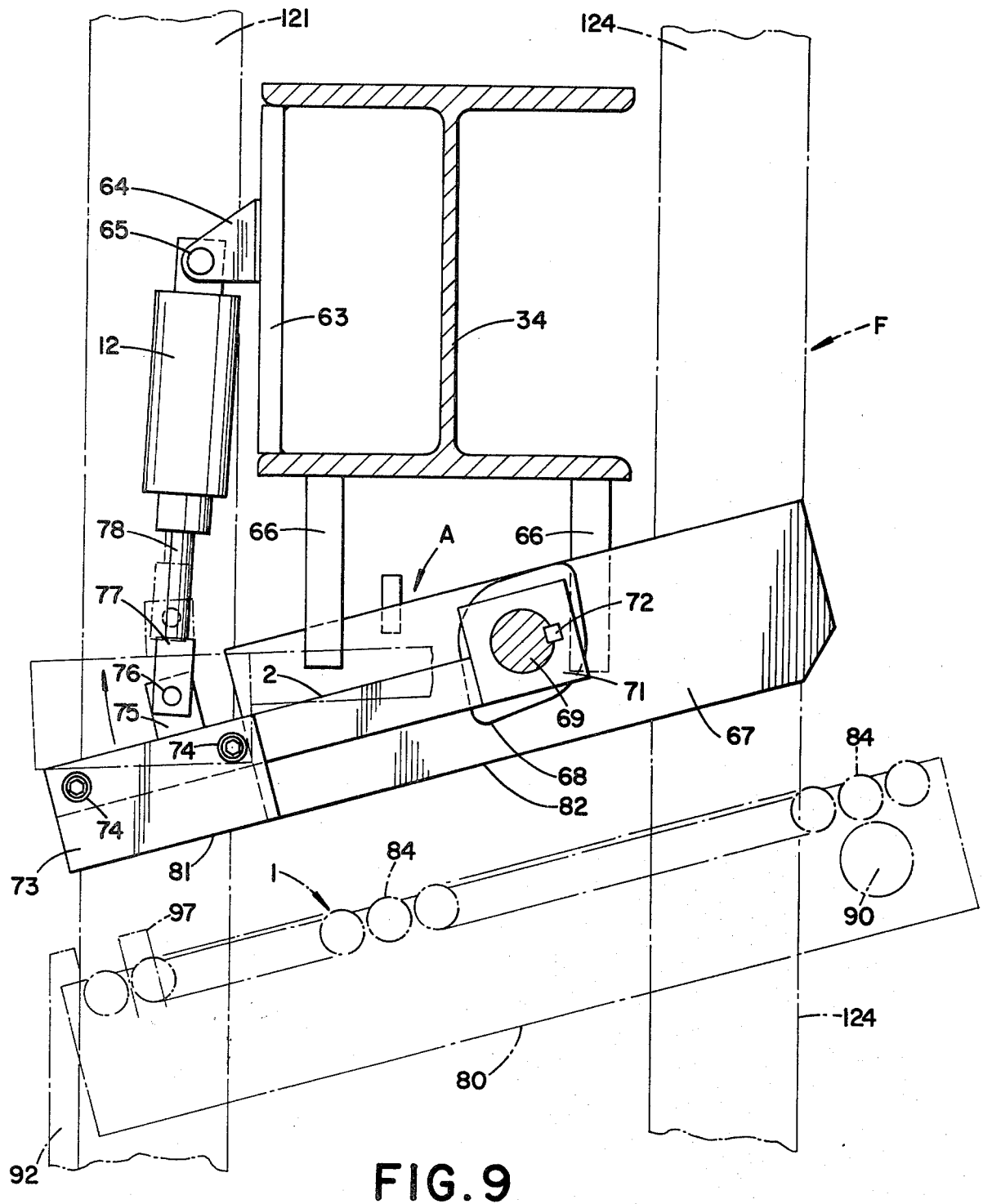
FIG. 9 is a fragmentary transverse sectional view taken on the line 9—9 of FIG. 1.

Referring more particularly to the drawings which are drawn substantially to scale and in which like parts are identified by the same numerals throughout the several views, FIG. 1 and 1A show one form of bar feeder R which may be employed in the practice of the present invention and which includes a roller feed ramp assembly 1 for holding a single row of long concrete reinforcing rods or bars b, known as "rebars," an overhead retainer means A overlying the row of bars and having retractable retainer arms 2, an escapement and roller ramp assembly B having escapement arms 3 for lifting a predetermined number of bars b from the ramp, an infeed conveyor means C having (flat) cylindrical rolls 4 for receiving the bars b, and magnetic drive roll means D having a series of magnetic V-grooved drive rolls 5 for directing the bars through the press P.

An outfeed conveyor means E is located on the discharge side of the press to feed the bars to a length gauge assembly L and to discharge the cut bars to a conventional discharge elevator or conveyor (not shown). The outfeed conveyor means includes a V-grooved magnetic support roll 6 driven by an air motor 7 and a series of (flat) cylindrical idler support rolls 8. The rolls 6 and 8 are mounted to swing between a horizontal supporting position and an inclined discharge position as indicated by the broken lines in FIGS. 3 and 10.

The infed conveyor has a drive motor 9 which drives the three V-grooved drive rolls 5 and which also drives the flat conveyor rolls 4 when the conveyor clutch 18 is engaged. The bars b on the conveyor rolls 4 are maintained in regularly spaced positions by magnetic spacer means 10 comprising a series of fanning magnets 11 disposed transverse to the bars and a fraction of an inch below the bars. The magnetic spacing of the bars aligns them with the V-grooves of the magnetic drive rolls 5 which feed the bars through small entrance openings at the side of the press P.

Figure 11:
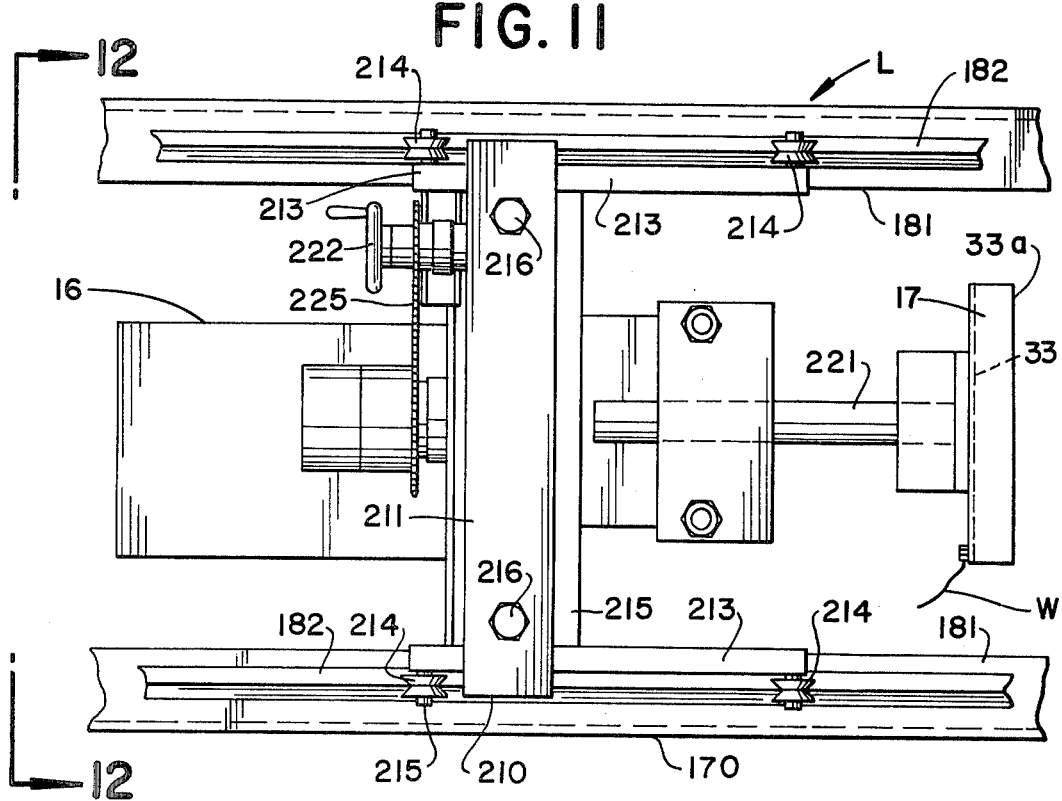
FIG. 11 is a fragmentary top view of the length gauge assembly.

Electric, hydraulic or pneumatic motors can be used to effect movement of the parts, but it is preferable to move the escapement arms, support rolls and other parts rapidly using reciprocating-piston pneumatic cylinders or the like and a pneumatic system with solenoid-operated reversing valves to control the air supply to the cylinders. As herein shown the retractable retainer arms 2 are moved by pneumatic cylinders 12 (FIG. 9), the escapement arms 3 are moved by pneumatic cylinders 13 (FIG. 6), the support drive roll 6 is moved by a pneumatic cylinder 14 (FIG. 10), and each of the idler support rolls 8 is moved by a pneumatic cylinder 15 (FIG. 3). A similar reciprocating piston pneumatic cylinder 16 is provided in the length gauge assembly L to advance and retract the metal stop 17 (FIG. 11).

The bar feeder R preferably has a rigid steel frame of welded construction formed of a number of hollow box beams of generally rectangular cross section arranged to form longitudinal beams, vertical posts, and horizontal supports. As herein shown, a rigid steel frame F is provided having six parallel longitudinally spaced supporting sections 20 constructed as shown in FIG. 2 and comprising front and rear vertical posts or legs 21 and 22 resting on the floor f, a horizontal supporting box beam 23 extending between the posts, a pair of vertical supporting members 24 and 25 aligned with the legs 21 and 22, a horizontal box beam 26 extending from the top of the member 25 to the rear post 22, and a pair of short horizontal reinforcing members 27 and 28 extending between the vertical members 21 and 24. The six sections 20 are rigidly connected by long longitudinal box beams 27 and 28 engaging the vertical members 25 and 22, respectively, and located at the upper surfaces of the transverse horizontal beams 23. A long longitudinal reinforcing beam 29 is welded to the bottoms of the six transverse beams 26 and extends beyond the first section 20 to a barengaging guide means 30 comprising a flat stop plate 31 parallel to the beam 26 and welded to the end of the beam 29 and to a support member 32 which is carried by the adjacent post 22. The stop plate 31 has a bar-engaging surface located in a plane perpendicular to the beams 27, 28 and 29 which defines a load line 1 as indicated in dot-dash lines in FIGS. 1 and 1A. The plate 31 is located high enough to engage the ends of the concrete reinforcing bars placed on the supporting beam 26. The machine illustrated is primarily intended to handle rebars with lengths of 20 to 30 feet or more and diameters up to 1 inch or so but the same type of machine with a longer length can handle bars with a length of 40 feet or more.

As shown a heavy supporting section 120 is provided at the end of the bar feeder R which is constructed like each of the sections 20 but replaces the posts and beams 22, 23, 25 and 26 with heavier box beams and replaces the vertical members 21 and 24 with longer heavier vertical posts 121 and 124. The section 120 is welded to the longitudinal beams 27 and 28 and has a horizontal bar-supporting beam 126 welded to the longitudinal beam 29 in alignment with the beams 26.

The tall posts 121 and 124 are provided at both ends of the bar feeder R to support the opposite end portions of a long heavy horizontal I-beam 34 which carries the overhead retainer means A. Identical jack means 35 are provided at both ends of the I-beam and may be constructed as shown in FIGS. 7 and 8 to raise and lower the I-beam 34 to the desired adjusted position.

As herein shown short horizontal box-beam members 37 and 38 are welded to the vertical posts 121 and 124, a flat plate 39 is welded to each member 38 to support the associated jack means 35, and a flat plate 36 is welded to the bottom of the I-beam to engage the central lifting portion 41 of each jack which receives the vertical jack post 42. The base plate 43 of the jack rests on the plate 39, and the cylindrical housing 44 extends through openings in the plate 36 and the I-beam 34. The lifting portion 41 of each jack moves upwardly and downwardly on the post 42 in response to rotation of the crank 45 and the associated horizontal shaft 46 by virtue of conventional internal gearing. The shaft portion 47 of the crank is rotatably supported by a bracket 48 welded to the I-beam.

In order to maintain the I-beam in a horizontal position as it is adjusted vertically by the two jacks, the jacks are interconnected by a long connecting rod 49 extending almost the full length of the I-beam. Each end of the rod 49 is drivingly connected to the shaft 46 of the associated jack. At the same time the I-beam is guided at each end by roller guide means 50 including two pairs of rollers 51 that travel on flat vertical track plates 52 welded to the posts 121 and 124. The shafts 53 of the rollers are threaded at the ends to receive hexagonal nuts 54 and are supported on flat vertical plates 55 which are welded to the top and bottom flanges of the I-beam 34. Each plate 55 has a pair of elongated slots 57 which receive the shafts 53 and permit longitudinal adjustments thereof. An adjusting screw 58 is provided at each slot and is held in position by an adjustable nut 59 which engages a narrow flat plate 61 at the end of each plate 55. The plates 55 and 61 have internally threaded bores to receive the screws 58.

The overhead retainer means A are supported by the I-beam as indicated in FIG. 9. A flat plate 63 is welded to the beam to provide a support for brackets 64 which carry the pivot pins 65 of the cylinder 12. A pair of bars 66 are welded to the bottom flange of the I-beam to support the fixed overhead retainer plates 67, and bearing members are mounted on said plates to support a shaft 69 in a horizontal position parallel to the beam 34. Each of the retractable overhead retainer arms 2 has a hub portion 71 mounted on the shaft and connected thereto by a key 72 and has a removable front plate 73 connected to the arm 2 by screws 74. The plate 73 has a bracket 75 carrying a pivot pin 76 which extends through a connecting member 77 of the piston rod 78.

A plurality of cylinders 12 may be employed to operate the arms 2 and swing the shaft 69 about its axis. The cylinders may, for example, move the arms from the normal position shown in solid lines in FIG. 9 to the raised position shown in broken lines in that figure. In the normal position, the straight lower surfaces 81 and 82 of the plates 73 and 67, respectively, are located in a common plane parallel to the inclined ramps of the roller feed ramp assembly 1.

As shown in FIGS. 4 and 5, each assembly 1 comprises a main feed ramp 80 in the form of a flat rectangular plate having a straight upper surface 83 located in a plane parallel to the surfaces 81 and 82 of the overhead retainer means. The plate 80 is welded to the posts 21 and 25 with its upper surface 83 in position to receive bars from the flat horizontal upper surfaces of the transverse supporting beams 26 (as shown in FIG. 4).

When smooth cylindrical bars are being loaded, the incline of the range 80 is sufficient to effect rolling of the bars to the desired position on the ramp. However, when feeding non-circular bars or rebars with irregular surfaces, it is preferred to provide the ramp with rollers 84 to facilitate movement and help maintain the bars b in parallel positions. A pair of auxiliary ramp plates 85 and 86 are detachably mounted on the main ramp plate 80 of each roller feed ramp assembly 1 to support the rollers 84. As shown the plates 85 and 86 are mounted on two horizontal support bars 87 of square cross section having screws 88 at their opposite ends. The screws extend through the plates 80 and 86 and provide a rigid detachable connection to the bars 87.

Similar screws 89 extend through the rollers 84 and are screwed into internally threaded holes of the plates 85 and 86 to provide rigid horizontal supporting shafts for the rollers. The screw receiving holes of the plates 85 and 86 are regularly spaced with their axes in a straight row which extends the full length of each plate as indicated in FIG. 4, said row being parallel to the upper surface 83 of the ramp 80 and spaced therefrom a distance somewhat less than the radius of the rollers 84 so that the rollers project above the plane of the surface 83. It will be understood that the broken lines in FIGS. 4 and 5 are intended to indicate the presence of rollers along the full length of each ramp plate.

Each plate 85 and 86 has a semicircular notch 91 to receive a long horizontal escapement arm shaft 90, which is rotatably mounted on the ramp plates 80 in a position parallel to the I-beam 34 and perpendicular to the ramp plates.

Stops are provided to limit downward movement of the bars b on the inclined feed ramp and to position the bars b parallel to the I-beam 34 and to the direction of feed of the conveyor means C. As shown a bar 92 is rigidly mounted on each leg 21 at the end of the ramp plate 80 and has an end portion 93 projecting above the upper surface of the ramp to provide a stop.

In order to adjust the machine to handle bars of different diameter, means should be provided to adjust the relative position between the escapement arms 3 and the ramp stop, either by adjusting the position of the escapement arm or adjusting the stop. In the machine shown herein the relative adjustment is effected by moving the stop. FIG. 14 shows on suitable type of adjustable stop 95 in the form of a flat S-shaped plate held in its adjusted position by a screw attached to the ramp plate 80. The stop has a stop portion extending above the ramp to engage the bars b. a downwardly extending portion 98, and elongated slot to permit adjustment when the screw 96 is loosened.

A flat rectangular plate 101 is welded to each plate 80 and to a bar 102 which has an internally threaded bore of a single size to receive a long adjusting screw. The screw engages the stop 95 as shown in FIG. 14 and is held in its adjusted position by a nut 104. The adjustable stop 95 or other suitable adjustable stop means may be mounted on each of the six ramp plates 80.

FIG. 6 shows an escapement arm and roller ramp assembly A employed to transfer the bars b six at a time from the inclined feed ramp to the flat roll conveyor means C. The assembly includes an escapement arm 3 which is moved by the pneumatic cylinder 13 from a retracted position as shown in solid lines in FIG. 6 to a raised position as shown in dot-dash lines in that figure. As shown, the escapement arm comprises an elongated bar 105 rigidly connected to a boss 106 of square cross section which fits on shaft 90 and is drivingly connected to the shaft by key 107 and an associated keyway. A flat ramp plate 108 is rigidly mounted on the bar 105 by a pair of screws 109 which extend through the wide portion 112 of the plate into the bar 105. A bar 110 is rigidly mounted on the end of the plate 108 by a pair of screws 111 and extends above the bar-engaging surface of the ramp to provide a stop. A flat plate 113 is rigidly mounted on the plate 108 by a pair of screws 114. The flat upper surface 115 of the plate 113 is parallel to the flat upper surface of the plate 108 and is located in a plane tangent to the cylindrical surfaces of the rollers 134 and 136.

A bracket 116 is welded to the bar 105 to receive a horizontal pivot pin 117 which fits the connecting portion 118 of the piston rod 119 extending from the cylinder 13. A bracket 128 is welded to a horizontal beam 129 which is connected to a front legs 21 of the frame and extends the length of the bar feeder. The pneumatic cylinders 13 can be provided for several of the escapement arms 3 or can be provided for all of the arms. It is not essential to provide more than one cylinder 13 because swinging of the shaft 90 will effect movement of all of the arms 3 simultaneously. Suitable stops can be provided to limit the upward and downward movement of the escapement arms so that they are porperly positioned with respect to the inclined feed ramp.

It is preferable to provide the limit switches 5LS and 6LS to sense the movement of the escapement arms. For example, a rod or extension 206 may be provided on the bar 105 or the boss 106 and extend downwardly to engage the actuating members 207 and 208 of the limit switches in response to movement of the shaft 90 as shown in FIG. 6.

When handling rebars, bars of non-circular cross section or bars which do not roll readily, it is preferable to provide a roller-ramp means 130 such as indicated in FIGS. 6 and 6A. Such means includes a flat ramp plate 131 of generally rectangular shape rigidly mounted on a pair of horizontal support bars 132 which are welded to or otherwise rigidly connected to the plate 108. The ramp plate 131 is preferably removable from the plate 108, and it may be detachably connected to the bars 132 by screws 133. The ramp plate supports a row of regularly spaced rollers 134 which are arranged generally like the rollers 84 of the roller feed ramp assembly 1. The rollers 134 are mounted for rotation on screws 135 which extend through the rollers and are rigidly attached to the ramp plate. The axes of the screws 135 are located in a common plane parallel to the flat upper surface of the plate 108, each screw providing a rotatable support for its associated roller.

Rollers 136 are provided on the ramp plate 108 which are the same size as the rollers 134 and which are supported in the same manner by a series of screw 137 which are rigidly connected to the plate 108.

It will be understood that the rollers 134 are preferably provided along the entire length of the ramp plate 131 as shown in FIG. 6 and that the rollers 134 can be provided in a similar matter for a comparable distance along the length of the ramp plate 108. For convenience, all of the rollers are not illustrated in FIG. 6A, but it should be understood that they would preferably be present. Likewise it will be understood that the rollers 84 are provided along the full length of the ramp plates 85 and 86 in FIGS. 4 and 5.

When the equipment is adjusted to receive concrete reinforcing bars b, as indicated in FIG. 6, the lower surfaces 82 of the retainer plates 67 will be spaced from the plane of the feed ramps 80 a distance corresponding to the diameter of the bars as to provide a path for moving of the bars to the stop 97. The adjustable stop 97 is positioned so that the flat rear surface 138 of the ramp plate 108 of each escapement arm is located at the end of the sixth bar and so that, when the escapement arms are lifted, the plate 108 will engage the seventh bar to prevent movement of the remaining bars on the feed ramp. There may, for example, be twelve or more bars remaining on the ramp which apply a substantial force to said six bars tending to disarrange them. It is important to provide means for maintaining the six bars in proper positions as they are lifted away from the remaining bars on the feed ramp. This is the function of the retractable retainer arms 2. It will be understood, however, that the arms 2 should not interfere with or prevent the rolling of the bars toward the stop 10.

When the escapement arms 3 are raised to their upermost position, as shown in broken lines 6, the upper surface of the ramp plate 108 is inclined downwardly toward the stop 110 so that the bars will roll toward the stop. Subsequent lowering of the escapement arms then lowers the bars onto the flat rolls 4 of the infeed conveyor means C. The fanning magnets 11 cause the bars to separate from each other and to assume regularly spaced positions as described hereinafter.

The infeed conveyor means C is supported on the frame F of the bar feeder by a pair of longitudinal box beams 141 and 142 which are horizontally aligned and held in parallel positions by plurality of horizontal transverse supporting bars 143, which are welded to the beams. Bearing supports or other supporting members 144 and 144 are mounted on top of the beams 141 and 142 to provide supports for the horizontal shafts 146 of the flat rolls 4.

The six bars b are equally spaced along the length of each cylindrical roll 4 as indicated in FIG. 13. As shown in that figure each fanning magnet 11 extends almost the full length of the adjacent roll 4 and is supported in a horizontal position by a pair of supports 147 carried by the transverse bar 143. Each fanning magnet 11 is supported in the same manner and is located with its flat upper surface parallel to the upper surface of the roll 4 and located in a plane spaced a small fraction of an inch, such as a quarter of an inch, below the plane containing the upper surfaces of the conveyor rolls 4. Thus the fanning magnets are able to induce magnetism in the bars b without touching the bars or interfering with their movement. Each fanning magnet is a permanent type magnet which induces magnetic polarities in the bars b passing over them. The polarity will be alike in all bars so as to cause them to be automatically repelled from each other. Because the repelling force is equal in all of the tubes, the tubes will automatically adjust themselves to maintain equal spacing. While the fanning magnet is shown herein as being a stationary plate it will be understood that a rotating magnetic drum may also be used, as disclosed, for example, in U.S. Pat. No. 2,939,568.

To assist in positioning the outermost bars b on the conveyor, a pair of longitudinal side rails are provided comprising bars 148 and 149 of circular cross section. Magnetic polarities are induced in these bars as well as in bars b, but the side rails are rigidly mounted in fixed position. As shown in FIG. 13, each side rail has a support portion 151 rigidly connected to the support member 144 or 145 by a screw 152.

The apparatus of the present invention preferably includes photoswitches for sensing the position of the bar b on the infeed conveyor C. Each photoswitch may be positioned as indicated in FIG. 13. As shown a flat vertical plate 154 is welded to a small plate 155 which is in turn welded to the horizontal beam 141. The plate 154 supports the housing 156 of a photoswitch 3PSC. At the other side of the plate, a vertical plate 157 is welded to the beam 142 and supports a second section 158 of the photoswitch assembly. A light beam a passes between the section 158 and the housing 156 in a direction parallel to the fanning magnet 11 and is located above the roll 4 so that any bar on the conveyor will be in the path of the light beam. The side rails 148 and 149 must be cut away so as not to interfere with the light beam and so as to permit swinging of the escapement arms 3.

It will be understood that the photoelectric switch assembly 4 may be constructed essentially the same as the photoelectric switch 3 of FIG. 13 except that the switch 4 is located closer ot the press P.

The infeed conveyor C has a conventional driving means which may be in the form of sprockets and chains or pulleys and belts. For example, as indicated in FIG. 1, the driving means 160 may include a series of sprockets or pulleys 161 and a series of belts or chains 162 and 163. A pair of axially spaced sprockets or pulleys 161 is located on the shaft of each conveyor roll 4. The belts or chains 162 must be relatively long to join the widely spaced rolls, and the belts or chains 163 are much shorter. The driving means 160 connects all of the cylindrical rolls 4 so they are driven in unison. A clutch 18 is provided at the roll 4 adjacent the magnetic driving rolls 5. This clutch makes it possible to stop the rotation of the flat rolls 4 while the driving rolls 5 continue to be driven. A pair of sprockets or pulleys 161 is provided on the shaft of each of the rolls 5, and a belt or chain 164 is mounted thereon so that the three rolls 5 are driven in unison by the motor 9, which is drivingly connected to the shaft of the first roll 5. When the clutch 18 is engaged, the motor 9 drives the motor 5 and simultaneously drives the rolls 4 of the conveyor means C. When the clutch is disengaged, the rolls 4 will stop rotating even if the motor 9 continues to operate.

Each of the driving rolls 5 is a magnetic roll having six circumferential V-grooves regularly spaced along the axis. Each roll 5 may be constructed substantially the same as the roll 6 shown in FIG. 10, which is made up of five metal wheels or discs 167 spaced apart by a series of flat circular non-metal plates 166. Narrow circular plates 168 are provided at the opposite ends of the roll. The discs 167 and 168 of each drive roll 5 or 6 are permanent magnets with polarities as indicated in FIG. 10, every other disc 167 having the same polarity. The magnetic force supplied by each drive roll pulls the bars b against the roll with sufficient force to insure adequate friction for proper axial feeding of the bars.

The V-grooves of the driving rolls 5 and 6 are in alignment with the bars being fed from the flat roll conveyor C. The fanning magnets 11 provide equal spacing of the bars b so that they will properly enter the V-grooves as the leading end of each bar moves from the flat roll 4 to the driving roll 5, and this remains true even when the diameter of the bars b is changed. Also the grooves of the driving rolls 5 help to position the bars b so that they will enter the small openings at the side of the press housing 40.

A push button station is preferably provided at this side of the press, and the various control signal lights, buttons, etc. may be located on a control panel or the like at this location so that one person can operate the machine.

The magnetic drive rolls 5 and 6 convey the six bars b from the infeed conveyor means C to the outfeed conveyor means E of the bar-receiving apparatus 170 at the opposite side of the press housing 40. The apparatus 170 is shown in FIGS. 1A, 3, 10, 11 and 12 and has a rigid steel frame G of welded construction for supporting the conveyor means E and the length gauge assembly L. The frame comprises a pair of parallel longitudinal box beams 171 and 172 supported as their opposite ends by two pairs of vertical legs or posts 173 and 174 and connected by transverse box beams 175 and 176. Horizontal box beams 177 and 178 extend between the front and rear posts 173 and 174 below and parallel to the beams 171 and 172, and a pair of short tubular vertical supports 179 are welded to each of the top beams 171 and 172 at longitudinally spaced locations to support longitudinal angles 181 which extend below the top beams to a location near the first roll 8 of the outfeed conveyor. Metal angles 182 are welded to the top of the angles 181 to provide track rails for supporting the length gauge assembly L during adjustment thereof.

The magnetic drive roll 6 and the (flat) cylindrical idler rolls 8 of the outfeed conveyor means E are retractably mounted so that they support the bars b in a horizontal position as they advance to the length gauge L and so that they swing downwardly out of the way of the cut bars as the bars are cut or sheared in the press P.

As shown in FIG. 10, a support drive means 180 is provided within the housing 40 of the press P and adjacent the discharge opening including a support plate 182 carried by the frame G on a horizontal pivot shaft 183 to swing between a horizontal position as shown in solid lines in FIG. 10 to a lower most retracted position as shown in broken lines in that figure. The plate 182 carries the drive roll 6 and its drive motor 7 and is swung vertically by a pneumatic power cylinder 14. A pair of stationary cushioned stops 184 and 185 limit the pivotal movement of the plate. The stop 185 rests on a horizontal support within the press and locates the plate 182 so that the axis of the drive roll 6 is in a horizontal position. The shaft of the drive roll is journalled for rotation in bearing means 187 carried by the plate 182 and is connected to the shaft 188 of the motor 7 by a connecting means 189. The housing of the motor 7, which may be a rotary air motor or an electric motor, is supported on the plate 182 with the drive roll 6.

A bracket 191 at the end of the cylinder 14 is mounted on a pivot pin 192 carried by a bracket 193 which is supported by a tubular support member 194 extending from the post 174 of the frame G. The piston rod 195 of the cylinder has a connecting member 196 mounted on a pivot pin 197 carried by the plate 182.

Each idler roll 8 of the outfeed conveyor has a pneumatic power cylinder 15 which is pivotally mounted similar to the cylinder 14 as shown in FIG. 3. The lower end of each cylinder is mounted on a pivot pin 198 carried by a bracket 199 welded to the horizontal beam 178. The piston rod of each cylinder 15 is connected to a pivot pin 201 carried by a bracket 202 which is welded to a main supporting arm 203. The arm 203 of each roll 8 is pivotally mounted on a horizontal pivot shaft 204 carried by the frame G which may, if desired, be connected to all of the arms 203 to swing all of them in unison (like the escapement arms 3). Each idler roll 8 is rotatably supported for free rotation about its axis by upright supports 205 carried by the arm 203, and the upper surfaces of all of the rolls 8 are located substantially in the same horizontal plane when the arms 203 are in their upper support positions shown in FIGS. 1A and 3. Conventional stop means may, if desired, be employed with the swinging arm 182 of the support roll drive means 180.

An inclined discharge ramp is provided in the form of a series of inclined ramp bars 19 rigidly mounted on the frame and engaging the horizontal beam 177 at spaced locations along its length. A series of brackets 207 are rigidly mounted on the beam 177 to position the ramp bars 19. The ramp bars are located above the drive roll 6 and the idler rolls 8 when said rolls are retracted to their lower positions shown in broken lines in FIGS. 3 and 10 so that the cut lengths from the press P are free to roll down the ramp to a conventional discharge elevator or discharge conveyor (not shown).

Figure 12:
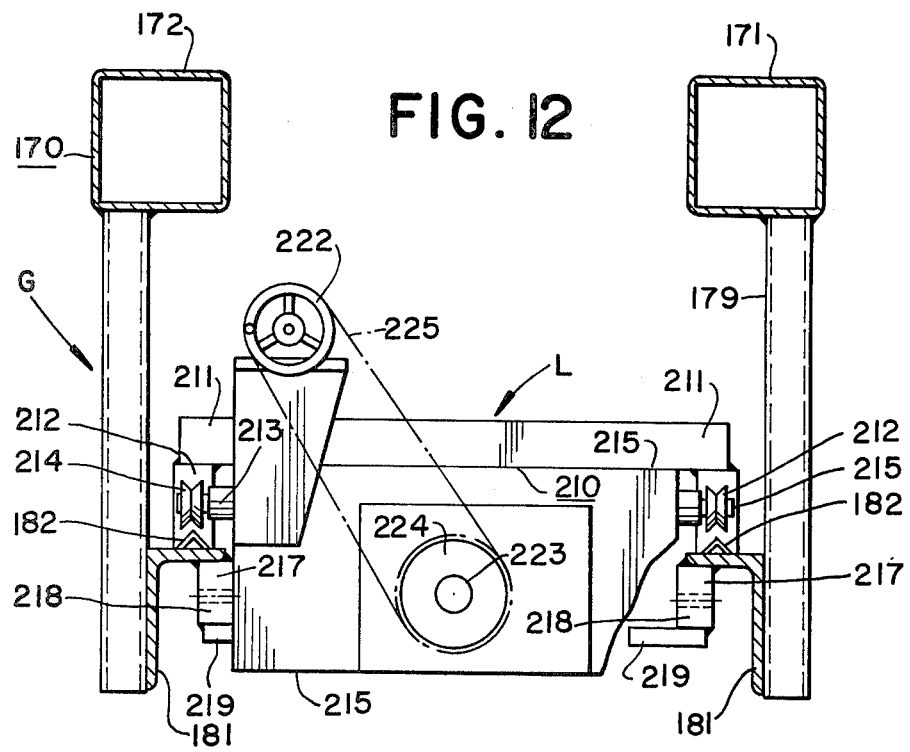
FIG. 12 is a fragmentary transverse sectional view taken on the line 12—12 of FIG. 11.

The length gauge L shown in FIGS. 1A, 11 and 12 may be designed to permit radical adjustment of the length of the bar sections cut from the bars b and preferably so that the lengths can be reduced by at least several feet when shorter cut lengths are desired. As shown the length gauge assembly includes a supporting frame 210 having a heavy transverse support bar 211 welded to blocks 212, which fit and rest on the rails 182. A rectangular housing 215 is provided below the bar 211 having a pair of parallel horizontal bars 213 rigidly mounted thereon. V-grooved wheels 214 are rotatably mounted on shafts 215 at the ends of the bars 213 and are located to ride on the rails 182 when the housing 215 is lowered. Long screws extend through the bar 211 into the housing to support the latter in the raised position shown in FIG. 12. The screws are long enough to lower the wheels 214 against the rails 182 and to permit raising of the blocks 212 above the rails so that the housing 215 and the frame 210 are free to move on the rails.

Means are preferably provided for locking the housing 215 in the adjusted position. As shown long longitudinal rack members 217 are welded to the flanges of the angles 181 and short rack members 218 of the same shape are welded to supporting members 219 carried by the housing 215. The rack members 217 and 218 have teeth which interfit to prevent longitudinal movement of the housing 215 in the position shown in FIG. 12. The teeth move out of engagement to permit free movement of the housing when the screws 216 are unscrewed to lower the wheels 214 onto the rails 182.

The pneumatic cylinder 16 is rigidly connected to and supported by the housing 215 and its piston rod 221 is rigidly connected to the retractable stop 17 to provide a cantilever support for the latter. The cylinder 16 is adjustably mounted on the housing 215 so that it can be moved axially by turning a handwheel 222 which rotates a threaded screw 223 through a sprocket wheel 224 and a chain 225. Gear means in the housing 215 causes the cylinder 16 to move axially in response to rotation of the shaft 223 and permits fine adjustments while the supporting frame is locked in a fixed position.

The bar feeder of the present invention is preferably provided with suitable limit switches, solenoid valves, electrical controls and the like to permit manual or automatic operation as described thereinafter.

As shown solenoids 1 SOL and 3 SOL control the motors for the conveyor drive and the support roll drive, respectively; solenoids 5 SOL and 6 SOL control the pneumatic cylinders 12 for raising and lowering the overhead retainer arms; solenoids 9 SOL and 10 SOL control the pneumatic cylinder 14 for raising and lowering the drive roll 6, solenoids 11 SOL and 12 SOL control the pneumatic cylinders 15 to raise and lower the idler rolls 8; and solenoids 13 SOL and 14 SOL control the pneumatic cylinder 16 to extend and retract the length gauge stop 17.

A number of limit switches are shown for sensing movement of the bars or parts of the machine including a proximity switch 1 PRS FIG. 4 located on the inclined storage ramp 80 to sense a sixth bar on the ramp and a proximity switch 2 PRS FIG. 3 located on the inclined discharge ramp 19 to sense any bar moving down the ramp. A pair of photoelectric switches 3 PSC are provided to sense the presence of a bar at a predetermined distances along the length of the roll conveyor to indicate when the trailing ends of the bars are clear of the first escapement arm and when said trailing ends of all of the bars are at or near the driven V-grooved rolls 5 FIG. 1A. Each of the photoelectric switches is located as shown in FIG. 13 so that the light beam is above and parallel to the support rolls 4 and will strike the middle part of any of the six bars b moving on the conveyor. Each of said switches is closed when no bars are present on the conveyor.

Limit switches 5LS and 6LS are provided to sense swinging movement of the escapement arms 3 and may be of the type shown in FIG. 6. These switches operate when the arms arrive at the fully raised or fully lowered position.

A limit switch 8LS is provided to indicate when the length gauge stop 17 is fully extended. If desired limit switches or the like may be provided to sense movement of the bars b to the length gauge, however, it is more convenient to connect a wire w to the flat metal plate 33 of the gauge as shown in FIG. 11 to sense contact with the end of a bar b.

A limit switch 9LS may be provided on the press P to indicate when the press die hold down is in contact with the material and may, for example, remain closed for one-quarter revolution of the crank. It may be closed in response to crankshaft rotation as the ram moves about half way down during a cycle.

The equipment may be operated manually by a single operator at the push button station PB by providing ready lights or audible signals or may be operated automatically with suitable automatic electric controls. The basic operations in the preferred process of this invention are indicated below.

When the equipment is ready for operation, assuming that the inclined storage ramp 80 is loaded with bars and the switch 4PSC indicates the absence of bars on the conveyor, the cycle is started. As soon as the switch 1 PRS senses a sixth bar on the inclined storage ramp, the solenoids 5 SOL and 7 SOL are energized to raise the escapement arms 3 and the overhead retainer arms 2, respectively, thus causing six bars to be transferred from the storage ramp to a position on the escapement arms above the conveyor rolls. The bars roll toward the stop 110 on the escapement arms as the arms approach the raised position indicated by broken lines in FIG. 6.

When the escapement arms arrive at the fully raised position, the limit switch 5LS closes to disengage the clutch 18, and, after a time delay, to lower the escapement arms 3 and the overhead retainer arms 2. This deposits the six bars on the flat rolls 4 of the conveyor, which is stopped by clutch 18 during this portion of the cycle to give the fanning magnets 11 enough time to space the bars uniformly, and simultaneously releases the bars on the storage ramp 80 so that they can roll against the ramp stops 97. A time delay of 1 to 2 seconds or so is provided after the solenoids 6 SOL and 8 SOL are energized, and the clutch 18 is then engaged to cause driving of the flat roll conveyor, whereby the six bars are fed longitudinally to the driving V-grooved magnetic rolls 5 and through the press P to the length gauge L. Contact of the end of one bar b with the vertical metal plate 33 of the length gauge creates an electric signal which passes through the wire w to an electric control, thereby energizing a light or other signal device. After a short time delay, such as 0.5 to 1 second, sufficient to allow all six bars to reach the length gauge, the press is energized to lower the ram. This is the START of one press cycle.

The limit switch 9LS is closed to energize the solenoids 10 SOL, 12 SOL and 14 SOL and deenergize the solenoids 1 SOL and 3 SOL when the ram is lowered about half way so that the support drive roll 6 and the idler rolls 8 are lowered and the length gauge stop 17 is retracted before the bars are sheared. The switch 9LS remains closed and the solenoids 1 SOL and 3 SOL remain deenergized during about one-quarter revolution of the press crank so that the grooved magnetic rolls 5 and the support roll 6 are stopped during shearing.

A short time (E.G., one second or so) after the press reaches the fully closed position and preferably after the press reaches the fully open position, the solenoids 9 SOL, 11 SOL are energized (E.G., by a timer and/or in response to press crank rotation) to extend the length gauge stop and raise the support idler and drive rolls to their horizontal support positions. The switch 7 LS is closed in response to movement of the support drive roll to its fully raised position to energize the solenoids 1 SOL and 3 SOL and thereby start the conveyor drive to advance the bars b through the press to the length gauge. The electrical contact of one bar with the length gauge then starts another press cycle, after a time delay, such as 1 second, to allow all six bars to contact the gauge as described previously.

The steps described above are repeated each time another press cycle is started.

The bar feeder of this invention is designed to provide continuous feeding of bars to the press without unnecessary delays. The photoswitches 3 PSC and 4 PSC are provided to permit raising of the escapement arms as soon as the arms are clear of the bars on the flat roll conveyor as soon as the conveyor is clear to receive them.

As the trailing ends of the bars clear the transverse light beam a of the photoswitch 3 PSC (FIG. 13), which is adjacent the first escapement arm (FIG. 1), the solenoid 5 SOL is energized and the escapement arms 3 are raised as previously described. The arms 3 remain in the raised position until the trailing ends of the bars b clear the horizontal light beam of the photoswitch 4 PSC, whereupon the solenoids 6 SOL and 8 SOL are energized to lower the escapement arms 3 and the overhead retainer arms 2 and deposit the new bars on the conveyor. The V-grooved rolls 5 and the support drive roll 6 will continue to drive the bars b to the length gauge L, and the feed and shear cycles will be continued so long as the inclined storage ramp 80 has an adequate supply of bars.

If the number of bars on said storage ramp is less than six, the proximity switch 1 PRS opens to deenergize the solenoids 5 SOL and 7 SOL and thereby stop the escapement cycle, however, the bars already on the conveyor will continue to be fed and sheared. As soon as additional bars are placed on the storage ramp to close switch 1 PRS, the escapement cycle will restart.

Operation of the bar feeder is stopped if the press is turned off or if the elevator or discharge conveyor receiving the cut bars is turned off.

Operation is also stopped if cut parts accumulate on the inclined discharge ramp 19. The proximity switch 2 PRS located on the ramp (FIG. 3) opens and closes during normal operation as the cut bars move out of the machine. If the switch is held closed for a substantial period of time, such as 2 or 3 seconds, because of cut parts accumulating on the ramp, the electric control for the press is deenergized to prevent operation of the press. In this condition the bars on the conveyor will be fed to the length gauge but the press will not go through its cycle. As soon as this condition is corrected by feeding the cut bars away from the ramp, the cycling of the press will restart.

Figure 15:
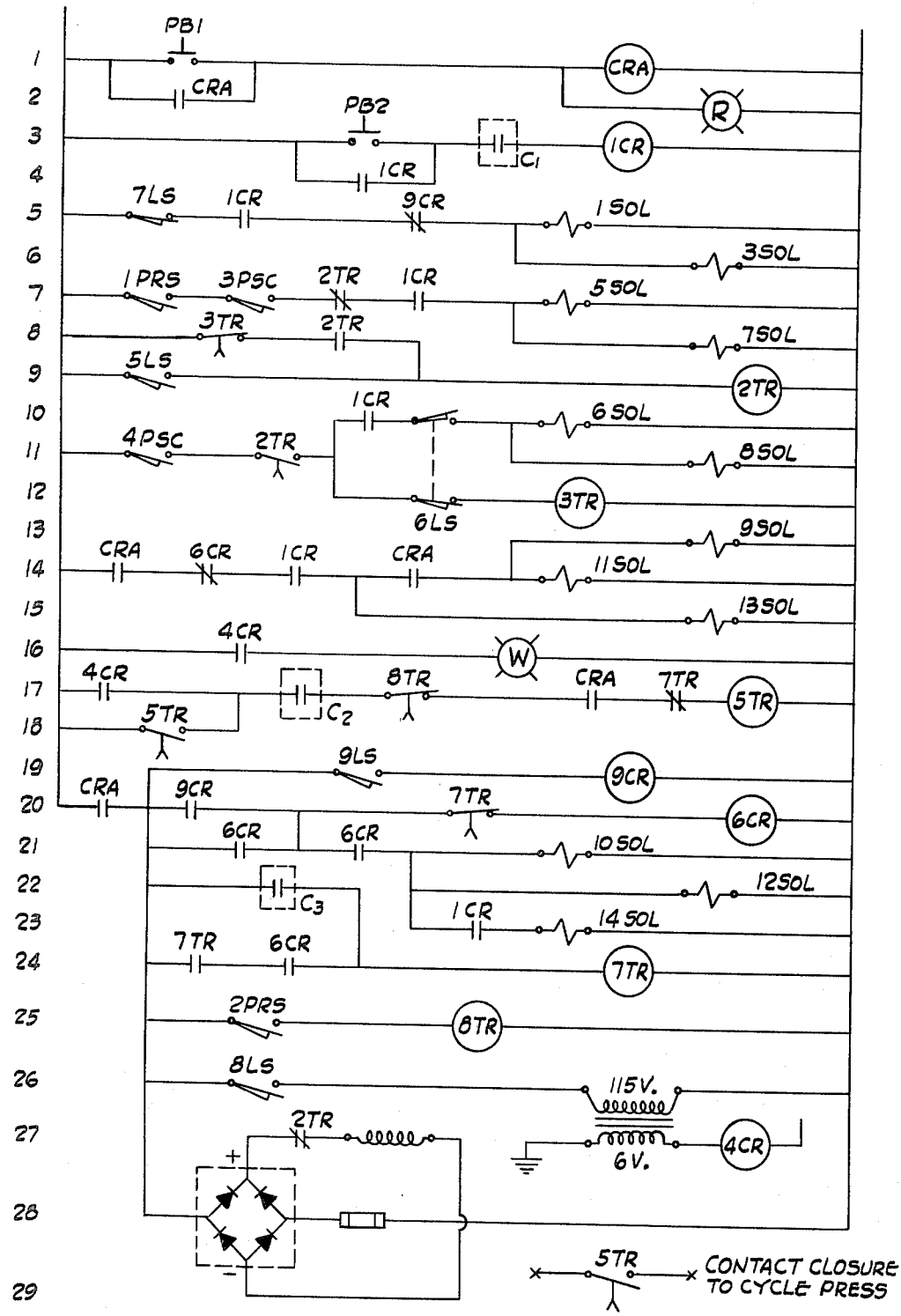
FIG. 15 is an electrical diagram showing electrical control equipment for effecting automatic feeding of the bars.

An automatic or manual control system can be provided in connection with solenoid-operated valves of a conventional pneumatic system. FIG. 15 is an electrical diagram with parts omitted showing an automatic control system which may be used. It may, of course, be modified to incorporate more safety features or to permit manual operation of some or all of the parts, for example, using electrical equipment of the general type disclosed in U.S. Pat. No. 3,655,067.

When the operator standing at the push button station PB wishes to operate the machine, he first depresses the "AUTO" pushbutton PB1 to energize the relay CRA in line 1 and closes the normally open CRA contacts in lines 2, 14, 17 and 20. He then depresses the "CYCLE START" pushbutton PB2 to energize the relay 1 CR in line 3 and closed the normally open 1 CR contacts in lines 4, 5, 7, 10, 14 and 23. The contact $C_1$ in line 3 is closed when the press motor is running.

The proximity switch 1 PRS is closed (assuming the storage ramp is full of bars) and the photoswitch 3 PSC is also closed (assuming no bars on the conveyor), so that the solenoids 5 SOL and 7 SOL are energized in lines 7 and 8. When the escapement arms arrive at the fully raised position, the limit switch 5 LS in line 9 closes to energize timer relay 2 TR and open the normally closed 2 TR contacts in lines 7 and 27, thereby causing disengagement of the clutch 18. After a predetermined time delay of 1 to 3 seconds and preferably about 2 seconds, the normally-open 2 TR contacts in line 11 close and, assuming that no bars are on the conveyor and that photoswitch 4 PSC is closed, the circuit in line 10 is closed to energize the solenoid 6 SOL and lower the escapement arms 3.

When the arms 3 are fully lowered, the limit switch 6LS closes line 12 to energize the timer relay 3TR. After a time delay of 1 to 3 seconds and preferably about 2 seconds, the normally-closed 3TR contacts in line 8 open to deenergize the relay 2TR and allow the 2TR contacts to close in line 27, thereby causing engagement of the clutch 18 and driving of the flat conveyor rolls 4. This feeds the bars through the press P to the length gauge L.

When the end of a bar makes electrical contact with the plate 33, the current in wire w causes the relay 4CR to be energized in line 27, assuming that the length gauge is fully extended to close limit switch 8LS in line 26. This closes the normally-open 4CR contacts in lines 16 and 17 to operate the signal light W (at the pushbutton station PB) and energize the timer relay 4TR in line 14. The contacts $C_2$ line 17 of the elevator or discharge conveyor will be closed if it is operating and carrying away the cut bars.

After a time delay of 0.5 to 1.5 seconds and preferably about 1 second, the normally-open 5TR contacts in line 18 and in the press circuit line 29A close, thereby starting the press cycle. Rotation of the crankshaft of the press closes the limit switch 9LS in line 19 when the ram is lowered about half way to energize the relay 9CR, open the normally-closed 9CR contacts in line 20. This also energizes the relay 6CR to open the normally-closed 6CR contacts in line 14 and close the normally-open 6CR contacts in lines 21 and 24, thereby energizing the solenoids 10 SOL, 12 SOL and 14 SOL to swing the support rolls down and retract the length gauge.

When the press reaches the fully closed position after shearing the six bars, the contacts $C_3$ of the press circuit line 22 close to energize the timer 7TR and close the 7TR contacts in line 24. After a short time delay of 0.5 to 1.5 seconds and preferably about 1 second, the normally-closed 7TR contacts in line 20 open to deenergize the relay 6CR and allow the 6CR contacts to close in line 14, thereby energizing solenoids 9 SOL, 11 SOL and 13 SOL, raising the support rolls and advancing the length gauge.

After the shearing is completed, further rotation of the press crank causes the limit switch 9LS to open and deenergize relay 9CR, thereby allowing the 9CR contacts to close in line 5 and to energize the solenoids 1 SOL and 3 SOL. The bars are then fed through the press to the length gauge and the press is again signalled to cycle.

The electrical controls described above permit the equipment to repeat the process over and over. As the cut bars move down the discharge ramp they cause the proximity switch 2PRS to close temporarily and energize the timer relay 8TR in line 25, but nothing happens if the switch is allowed to open quickly. The timer relay 8TR provides a predetermined time delay, such as 2 seconds or so, and, if the switch 2PRS remains closed for this period of time due to accumulation of bars on the discharge ramp, the normally-closed 8TR contacts in line 17 will open to deenergize the relay 5TR and cause the 5TR contacts in line 18 and in the press circuit line 29A to open, thereby preventing operation of the press until the discharge ramp is cleared of cut bars.

It will be apparent to those skilled in the art that electrical controls may be employed which are quite different from those shown in FIG. 15 and that the bar feeding equipment used to carry out the process of this invention may be different from that shown in FIGS. 1 to 14. Also the equipment shown herein may readily be adjusted or modified to handle bars or tubes of different cross section or different size or weight or to feed four, five, seven or eight bars on the conveyor at one time instead of six at one time.

As shown the equipment is specially designed to handle "rebars" with an irregular notched or ribbed outer surface and a diameter of from about one half inch to about one inch, and such changes in diameter can be readily be accommodated by adjustment of the height of the overhead retainer plate 67 (FIG. 9) and the I-beam 34. Similar adjustments can be employed to permit feeding of solid or hollow bars with width or diameter of two inches or more, but this may require replacing the six-grooves or using a larger press P. It may also be desirable to adjust the position of the escapement plate 108 relative to the arm 105 when the bar diameter is changed to feed a different number of bars or pipes to the conveyor means C each time the escapemnt arms go through their cycle, or to adjust the position of stop 110 relative to plate 108.

Various other possible modifications in the equipment will become apparent to those skilled in the art. The length of the feeder can be increased, for example, to accommodate bars with a length from 40 to 50 feet.

The rollers 84, 134 and 136 can be detached and removed when feeding externally cylindrical bars or tubes, and special means may be provided to facilitate handling of metal angles of L-shaped cross section or other bars of non-circular cross section (see U.S. Pat. No. 3,957,163).

If the long bars are cut by sawing instead of shearing, retraction of the support rolls 6 and 8 may be unnecessary and the electrical controls can be modified accordingly. Also the inclined discharge ramp 19 may then be replaced with other bar discharge means, such as reciprocating pushers which engage the cut bars b' and push them laterally off the conveyor rolls.

It will be understood that the fanning magnets used to space the bars b on the conveyor rolls 4 may be located to induce magnetic polarity in the bars b as the bars roll down the arms 3 or as the bars are lowered onto the rolls 4. Such magnets may be located on the arms 3 but are preferably located between adjacent rolls 4. Various magnetic means may be employed to induce magnetic polarity in the bars b including magnetic rolls or drums as are disclosed, for example, in U.S. Pat. No. 3,693,779 or U.S. Pat. No. 2,939,568.

As illustrated herein, a bundle 200 with a weight of five tons or more containing 200 to 350 or more "rebars" is placed on the frame F (FIG. 2) and the straps are cut and removed to permit an operator to form a single row of bars on the horizontal support beams 26 and to move them manually to the inclined feed ramp (80). It will be understood, however, that the bars b or other non-cylindrical bars may be fed automatically from a bundle to form a single row of parallel bars using an unscrambler, such as disclosed in applicant's U.S. Pat. No. 3,506,142 or U.S. Pat. No. 3,931,896 or using other feeding equipment, such as disclosed in U.S. Pat. Nos. 2,159,851; 2,946,463; 2,999,603 or 3,292,799.

It will be understood that in accordance with the patent laws, modifications of the specific methods and devices disclosed herein may be made without departing from the spirit of the invention.

Having described my invention, I claim:

1. Apparatus for feeding long flexible metal bars of relatively small cross section comprising an inclined storage ramp for receiving a single row of said bars and supporting them in side-by-side parallel relation, infeed conveyor means at the side of said ramp for receiving a series of bars and feeding them axially in a direction generally parallel to the bars on the ramp, escapement means for lifting and transferring at least 4 bars laterally from said ramp to said conveyor means at a predetermined loading zone during each cycle, a plurality of magnetic drive rolls having at least 4 axially spaced circumferential grooves for receiving the bars fed axially from said conveyor means, and magnetic means for inducing magnetic polarity in the bars moving from said escapement means to said conveyor means to straighten and space the bars, to maintain them in spaced parallel positions on the conveyor means, to guide the bars to the respective circumferential grooves of the magnetic drive rolls, and to increase the frictional driving force at said rolls, said escapement means comprising a plurality of escapement arms mounted to move in unison between a lower retracted position below the bars on said storage ramp and a raised position higher than the discharge end of said ramp and having upper surfaces forming a ramp which, in said raised position, is inclined downwardly toward said conveyor means and extends laterally over the conveyor means to permit movement of the bars by gravity from positions above the storage ramp to positions above the conveyor means, whereby bars of widely varying diameters can be fed from said storage ramp to said drive rolls.

2. The apparatus of claim 1 wherein overhead retainer means are provided above the storage ramp and are mounted to move upwardly with the escapement arms to maintain the bars on said arms in a single row as they are lifted above said storage ramp.

3. The apparatus of claim 1 or claim 2 wherein means are provided for sensing the position of the bars on said conveyor means and for raising the escapement arms in response to movement of the trailing ends of the bars clear of the path of movement of said escapement arms, and means are provided for lowering said escapement arms in response to movement of said trailing ends clear of the path of movement of the bars carried on said escapement arms, whereby the axial spacing of bars on said conveyor means is minimized.

4. Bar transfer means for use in a bar feeder as described in claim 1 wherein the inclined storage ramp has a multiplicity of antifriction rollers for supporting at least ten bars in parallel side-by-side relation, a stop is provided at the lower end of said storage rap, and the escepement arms are mounted to swing between a lower inclined retracted position below the bars on said ramp and a less inclined raised position above said ramp, each arm having a multiplicity of antifriction rollers arranged to lift three to ten of said bars when the arm is raised and to form a roller ramp inclined downwardly toward said conveyor means and extending laterally over the conveyor means, whereby the bars move by gravity from positions above the storage ramp to positions above the conveyor means and are magnetized as they are transferred to the conveyor means, and a stop is provided for engaging the lowermost bar.

5. The combination of claim 4 wherein overhead retainer means are provided above said ramp to maintain a single row of bars on the ramp including overhead retainer arms which are moved up and down with the escapement arms to maintain a single row of bars as they move laterly to positions above the conveyor, and at least one long straight iron rod is provided together with magnetic means to include magnetic polarity in said rod and in the bars being fed to said conveyor.

6. The apparatus of claim 1 wherein said escapement means comprises a plurality of escapement arms (3) mounted to swing in unison from a retracted position below the bars on said ramp (80) to an inclined raised position higher than said ramp, each arm (3) having a multiplicity of circular antifriction rollers (134, 136) arranged to support a series of said bars and to form a ramp (108) inclined downwardly toward said conveyor means and extending laterally over the conveyor means, whereby the bars move by gravity from positions above the storage ramp (80) to positions above the conveyor means and are magnetized as they are transferred to the conveyor means (C).

7. The apparatus of claim 1 wherein overhead retainer means (A) are provided to maintain a single row of bars on said storage ramp (80) and on said escapement arms (3), said means including a plurality of overhead retainer arms (2) mounted on stationary supporting frame to swing with the escapement arms and located near the upper surfaces of the bars carried by said escapement arms (3), motor means (13) are provided to operate said escapement arms, and motor means (12) are provided to raise said overhead retainer arms when the escapement arms are raised.

8. The apparatus of claim 7 wherein said stationary frame is mounted above said storage ramp for movement vertically to fixed adjusted positions and comprises a rigid horizontal beam with a length of more than twenty feet supported at its opposite ends by screw means which may be adjusted to change the height of the beam relative to the ramp, said overhead retainer means includes a rigid plate with an inclined lower surface parallel to said ramp, said plate being rigidly connected to said stationary frame and being adapted to being spaced one half inch to two inches or more from said ramp, said overhead retainer arms are pivotally mounted on said stationary frame, and a stop is adjustably mounted at the end of said ramp to engage the lowermost bar on the ramp, whereby the apparatus may be adjusted to feed bars of different diameter by adjusting said stop and adjusting the height of said stationary frame without replacing said magnetic drive rolls.

9. The apparatus of claim 8 wherein each escapement arm includes an escapement plate having means forming an inclined roller ramp for lifting three to ten bars from said ramp and having an end portion for engaging one of the remaining bars on the ramp to prevent the remaining bars from moving down the ramp when the escapement arm is raised.

10. The apparatus of claim 1 wherein iron bars are mounted in fixed positions at opposite sides of said conveyor means parallel to the direction of feed and extending along the length of said loading zone for magnetically repelling the outermost reinforcing bars on said conveyor to provide proper spacing of the bars in said loading zone, said fixed iron bars being located to permit swinging of said escapement arms past the axes of said iron bars, and means are provided for inducing magnetic polarity in said iron bars.

11. The apparatus of claim 1 wherein motor means are provided for actuating said escapement arms to transfer 4 or more bars from said ramp to positions above the trailing ends of the bars in said loading zone, means are provided for automatically causing operation of said motor means when the trailing ends of the bars are out of the path of movement of said escapement arms to advance a series of bars to positions above said loading zone, means are provided for automatically causing lowering of the escapement arms as soon as the trailing ends of the bars on the conveyor means leave said loading zone, means are provided for causing the escapement arms to remain in retracted positions below the bars on the conveyor until the trailing end portions thereof are about to move out of the path of movement of said escapement arms and for causing the arms to return to their upper positions before said trailing ends leave said loading zone.

12. The apparatus of claim 11 wherein means are provided for operating said motor means in response to axial movement of the bars out of said loading zone.

* * * * *